United States Patent [19]
Takashima et al.

[11] Patent Number: 6,158,724
[45] Date of Patent: Dec. 12, 2000

[54] LIQUID FILLED VIBRATION ISOLATING DEVICE

[75] Inventors: Yukio Takashima; Yutaka Sadamori, both of Osaka, Japan

[73] Assignee: Toyo Tire & Rubber Co., Ltd., Osaka, Japan

[21] Appl. No.: 09/257,422

[22] Filed: Feb. 25, 1999

[30] Foreign Application Priority Data

Aug. 31, 1998 [JP] Japan ................................. 10-246019

[51] Int. Cl.[7] ............................ F16F 13/18; F16F 13/20; B60K 5/12
[52] U.S. Cl. ..................................... 267/140.13; 267/219
[58] Field of Search ............................ 267/140.13, 219, 267/140.14, 220, 140.11, 140.12, 35; 248/562, 636

[56] References Cited

U.S. PATENT DOCUMENTS

| | | | |
|---|---|---|---|
| 4,657,227 | 4/1987 | Hofmann . | |
| 4,671,227 | 6/1987 | Hollerweger et al. . | |
| 4,693,455 | 9/1987 | Andrä . | |
| 4,787,609 | 11/1988 | Dan et al. . | |
| 4,793,600 | 12/1988 | Kojima . | |
| 4,836,512 | 6/1989 | Lun ..................................... | 267/140.13 |
| 4,925,162 | 5/1990 | Kojima ............................... | 267/140.13 |
| 4,928,935 | 5/1990 | Matsui . | |
| 4,938,463 | 7/1990 | Miyamoto ............................... | 267/219 |
| 4,981,286 | 1/1991 | Kato et al. . | |
| 5,028,038 | 7/1991 | de Fontenay . | |
| 5,028,039 | 7/1991 | Sato . | |
| 5,031,884 | 7/1991 | Baudrit et al. . | |
| 5,035,407 | 7/1991 | Takeguchi et al. . | |
| 5,094,433 | 3/1992 | Dan et al. . | |
| 5,178,374 | 1/1993 | Maeno . | |
| 5,215,292 | 6/1993 | Ishiyama et al. . | |
| 5,240,233 | 8/1993 | Kato et al. ........................... | 267/140.13 |
| 5,259,598 | 11/1993 | Hibi et al. ........................... | 267/140.13 |
| 5,295,671 | 3/1994 | Nakagaki et al. . | |
| 5,499,799 | 3/1996 | Kojima ................................. | 267/140.13 |
| 5,632,472 | 5/1997 | Kato et al. ........................... | 267/140.13 |
| 5,647,579 | 7/1997 | Satoh . | |
| 5,738,343 | 4/1998 | Nakajima et al. . | |
| 5,769,402 | 6/1998 | Ide et al. . | |
| 5,897,092 | 4/1999 | Mizutani et al. . | |
| 5,950,994 | 9/1999 | Hosoya et al. ....................... | 267/140.13 |

FOREIGN PATENT DOCUMENTS

| | | |
|---|---|---|
| 59-157137 | 10/1984 | Japan . |
| 9-100866 | 4/1997 | Japan . |
| 9-210117 | 8/1997 | Japan . |

*Primary Examiner*—Douglas C. Butler
*Attorney, Agent, or Firm*—Jordan and Hamburg LLP

[57] ABSTRACT

This invention is aimed to obtain a liquid filled vibration isolating device, which is able to facilitate assembling procedure without adversely affecting shape or dimension of a caulked portion and without deteriorating mounting performance or reliability, and is able to promote vibration isolating effect both at a low frequency region and at a medium and high frequency region. To achieve this end, the vibration isolating device comprised of a rubber vibration isolating base body that connected with main-body metal fitting; and a two liquid chamber between the vibration isolating base body and a first diaphragm fixed to the main-body partitioned by a partition member and communicated with each other by an orifice; wherein the partition member is comprised of a ring-like partition-plate metal fitting that forms a first orifice, and a rubber orifice member that is attached to inner edge of partition-plate metal fitting and forms a second orifice, and an insert metal fitting butts on the rubber orifice member; and wherein one end of the second orifice is opened to the liquid chamber, other end of the second orifice is occluded by a second diaphragm; and the partition member is fixedly caulked to the main-body metal fitting along with the first diaphragm.

5 Claims, 7 Drawing Sheets

LIQUID FILLED VIBRATION ISOLATING DEVICE

BACKGROUND OF THE INVENTION

1. Field of the Invention

The present invention relates to a liquid filled vibration isolating device, more in details, to a liquid filled vibration isolating device used for supporting a power unit such as an engine of an automobile in a vibration isolating manner.

2. Description of Related Art

Conventionally, as a vibration isolating mount device of a liquid containing type interposed between members constituting a vibration transmitting system of an engine for connecting them in a vibration isolating manner, there has been known a vibration isolating device of a liquid containing type in which one end side of a main-body metal fitting and a first attaching metal fitting on an upper side are joined via a rubber elastic body (main body rubber), which is installed with a diaphragm comprising a rubber film on other end side of the main-body metal fitting opposed to the rubber elastic body and a second attaching metal fitting in a shape of a bottomed cylinder covering an outer side of the diaphragm and in which an intermediary between the rubber elastic body and the diaphragm constitutes a liquid containing chamber, the liquid containing chamber is constituted to partition into two liquid chambers by a partition member and the two liquid chambers are communicated with each other by an orifice provided to an outer peripheral portion of the partition member.

Further, there has been proposed such a vibration isolating device which particularly cope with both of shake vibration and idling vibration.

For example, in case of a liquid containing type mount disclosed in JP-A-9-100866, a sub partition member is made to cover the partition member on a side of the liquid chamber (main liquid chamber) in contact with the rubber elastic body, a third liquid chamber is installed at an inner portion of the partition member and a second orifice communicating with the third liquid chamber is installed by which an orifice path for low frequency side dealing with shake vibration and an orifice path for middle and high frequency side dealing with idling vibration are constituted and the functional performance is promoted.

Further, in case of a fluid containing type mount apparatus disclosed in JP-A-9-210117, a portion of a diaphragm (flexible rubber membrane) vulcanized and molded into one sheet is interposed between a constraint member and a partition member for forming a hermetically sealed air chamber on an outer side of the diaphragm, and a second liquid chamber (balancing chamber) communicating with a second orifice is set at an inner portion of the partition member between the partition member and the diaphragm other than a liquid chamber (balancing chamber) communicating with an orifice provided to an outer peripheral portion of the partition member to thereby deal with vibration in a wide frequency range such as shake vibration and idling vibration.

In case of the conventional liquid filled vibration isolating device promoting the vibration isolating effect in respect of shake vibration and idling vibration by installing the two orifices (paths) at the outer peripheral portion and the inner portion of the partition member as has been proposed, the separate diaphragms respectively having different moduli of elasticity need to install at end portions of the respective orifices (liquid chambers). As a method of fixing these diaphragms, it is general to hold the respective diaphragms or to insert metal fittings to which the diaphragms are vulcanized to adhere into a caulked portion of the main-body metal fitting and fixedly caulked thereto. Particularly, also the diaphragm communicating with the second orifice set at the inner portion of the partition member is fixedly caulked thereto along with the partition member as mentioned above.

Therefore, in the assembling operation caution is required to the shape of the caulked portion such that the dimensional deviation between the diaphragm and the partition member is not increased and skill is needed in the caulking operation. Further, even with caution, the dimensional deviation between the diaphragm and the partition member is not fully relieved. When the dimensional deviation becomes large, there poses a problem in which a hazard is resulted in the sectional areas of the orifices or the moduli of elasticity of the diaphragms and accordingly, adverse influence is effected also on the functional performance and adverse influence is effected on the promotion of the vibration isolating function in a low frequency region and a middle and high frequency region.

SUMMARY OF THE INVENTION

The present invention has been made in view of the above-described problem. Object of the invention is to provide a liquid filled vibration isolating device having a structure capable of being easily assembled without affecting shape or dimension of a caulked portion and without deteriorating mounting performance or reliability of a product, and capable of promoting vibration isolating effect at a low frequency region and at a medium and high frequency region.

According to an aspect of the invention, there is provided a liquid filled vibration isolating device comprising a vibration isolating base body formed of a rubber elastic body, a first attaching metal fitting joined to one of an upper side and a lower side of the vibration isolating base body, a main-body metal fitting in a cylindrical shape joined to other one thereof of the vibration isolating base body, a first diaphragm comprising a rubber membrane attached to the main-body metal fitting to oppose to the vibration isolating base body, and a second attaching metal fitting in a shape of a bottomed cylinder attached to the main-body metal fitting to cover an outer side of the first diaphragm, wherein an intermediary between the vibration isolating base body and the first diaphragm is formed as a liquid containing chamber, the liquid containing chamber is partitioned into two liquid chambers by a partition member and the two liquid chambers are communicated with each other by an orifice provided at the partition member, wherein the partition member comprises a partition-plate metal fitting in a ring-like shape internally brought into contact with the main-body metal fitting between the vibration isolating base body and the first diaphragm and forming the first orifice communicating the two liquid chambers with each other at an outer peripheral portion thereof, a rubber orifice member comprising a rubber elastic body attached to an inner peripheral portion of the partition plate metal fitting, and an insert metal fitting fixed to the partition-plate metal fitting to be brought into contact with a face of the rubber orifice member on a side of the first diaphragm, and wherein a second orifice is formed on a side of the rubber orifice member which is brought into contact with the insert metal fitting, one end portion of the second orifice is opened to either of the liquid chamber on a side of the vibration isolating base body and the liquid chamber on a side of the first diaphragm, other end portion thereof is closed by a second diaphragm comprising a rubber membrane and the partition member is fixedly caulked to the main-body metal fitting along with the first diaphragm and the second attaching metal fitting.

According to the liquid filled vibration isolating device, by setting the first orifice and the first diaphragm at its end portion as well as the second orifice and the second diaphragm at its end portion to be able to effectively achieve a vibration damping operation at frequency ranges respectively different from each other, the vibration damping operation is excellently carried out and an excellent vibration restraining effect can be achieved at two frequency regions of, for example, shake vibration and idling vibration.

Particularly, the second orifice is formed at the rubber orifice member and accordingly, setting or change of a length or a sectional area of the second orifice is facilitated and the device can be designed easily such that the vibration damping operation can effectively be carried out in a required frequency range. Further, the movement of the rubber orifice member can be restrained by the insert metal fitting fixed to the partition-plate metal fitting to be brought into contact with the rubber orifice member and a vibration isolating characteristic having excellent stability can be achieved.

Further, in case of the vibration isolating device, the second orifice and the second diaphragm are set to the rubber orifice member at inward (toward center axis of the device) area of the ring-like partition member and accordingly, the device can be assembled by constituting to integrate the partition member separately from the main-body metal fitting and press-fitting the partition member to be brought into internal contact with the main-body metal fitting and fixedly caulking thereto and the second orifice and the second diaphragm can be set without being influenced by shape or dimension of the caulked portion.

Therefore, a vibration isolating device installed with two orifices and installed with separate diaphragms respectively at the two orifices as a countermeasure against shake vibration and a countermeasure against idling vibration, can easily be integrated without changing shape or the like of the caulked portion. Further, the mounting performance or the reliability such as sealing performance at the caulked portion is not deteriorated.

According to another aspect of the invention, there is provided the liquid filled vibration isolating device wherein the rubber orifice member includes a groove for the orifice in a shape of substantially a semicircular ring on a side thereof in contact with the insert metal fitting, the groove is shielded by the insert metal fitting brought into contact with the rubber orifice member to thereby form the second orifice, one end portion of the second orifice is installed with an opening portion communicating with the liquid chamber on the side of the vibration isolating base body and other end portion thereof is arranged with and closed by the second diaphragm attached to a small opening provided to the insert metal fitting.

In this case, by integrating the partition member, the second orifice can be formed at a portion of the rubber orifice member and the second diaphragm can be installed at an end of the second orifice. Further, by fixedly caulking the partition member integrated in this way to the main-body metal fitting similar to the above described, the vibration isolating device can easily be constituted to assemble and setting or change of a length or a sectional area of the groove for constituting the second orifice is also facilitated.

According to another aspect of the invention, there is provided the liquid filled vibration isolating device according to a first one of the above aspects wherein the rubber orifice member includes a groove for the orifice in a spiral shape centering on an axis center of the device on a side thereof brought into contact with the insert metal fitting, the groove is formed as the second orifice in a spiral shape by being shielded by the insert metal fitting brought into contact with the rubber orifice member, an opening portion communicating with the liquid chamber on the side of the vibration isolating base body is installed at an outer side end portion of the second orifice in the spiral shape and the second diaphragm held at a central portion of the insert metal fitting is arranged on an inner side edge portion of a central portion thereof.

Also in this case, the constitution assembling is facilitated, setting or change of the length or the sectional area of the second orifice is facilitated and particularly, the length of the second orifice can be prolonged by constituting the spiral shape.

According to another aspect of the invention, there is provided the liquid filled vibration isolating device wherein the central portion of the insert metal fitting is opened, an inner metal fitting in a ring-like shape pushed to a side of the rubber orifice member at a peripheral edge portion of the opening is installed, the inner metal ring is fixedly connected to a central portion of the first diaphragm, the second diaphragm is integrally installed to an inner side of the inner metal fitting and the inner metal fitting is pushed by a peripheral edge portion of the opening of the insert metal fitting by which an inner side edge portion of the second orifice is closed.

In this case, the first diaphragm and the second diaphragm are integrally formed and the first diaphragm and the partition member can be fixedly caulked to the main-body metal fitting in a state in which they are integrated together and the device can be assembled with excellent integral performance.

According to another aspect of the invention, there is provided the liquid filled vibration isolating device according to the first one of the above aspects wherein the rubber orifice member includes a groove for the orifice in a shape of a substantially semicircular ring on a side thereof brought into contact with the insert metal fitting, the groove is formed as the second orifice by being shielded by the insert metal fitting brought into contact with the rubber orifice member, the second diaphragm is installed integrally with the rubber orifice member between the second orifice and the liquid chamber on the side of the vibration isolating base body at one end portion of the second orifice and other end portion thereof is opened to the liquid chamber on the side of the first diaphragm via an opening provided to the insert metal fitting.

In this case, by vulcanizing and molding the rubber orifice member, the second diaphragm can integrally be formed in accordance with forming the groove for the orifice and fabrication of the device is facilitated.

DETAILED DESCRIPTION OF THE PREFERRED EMBODIMENTS

An explanation will be given of modes of carrying out the invention in reference to embodiments shown by the drawings as follows.

Figure 1:
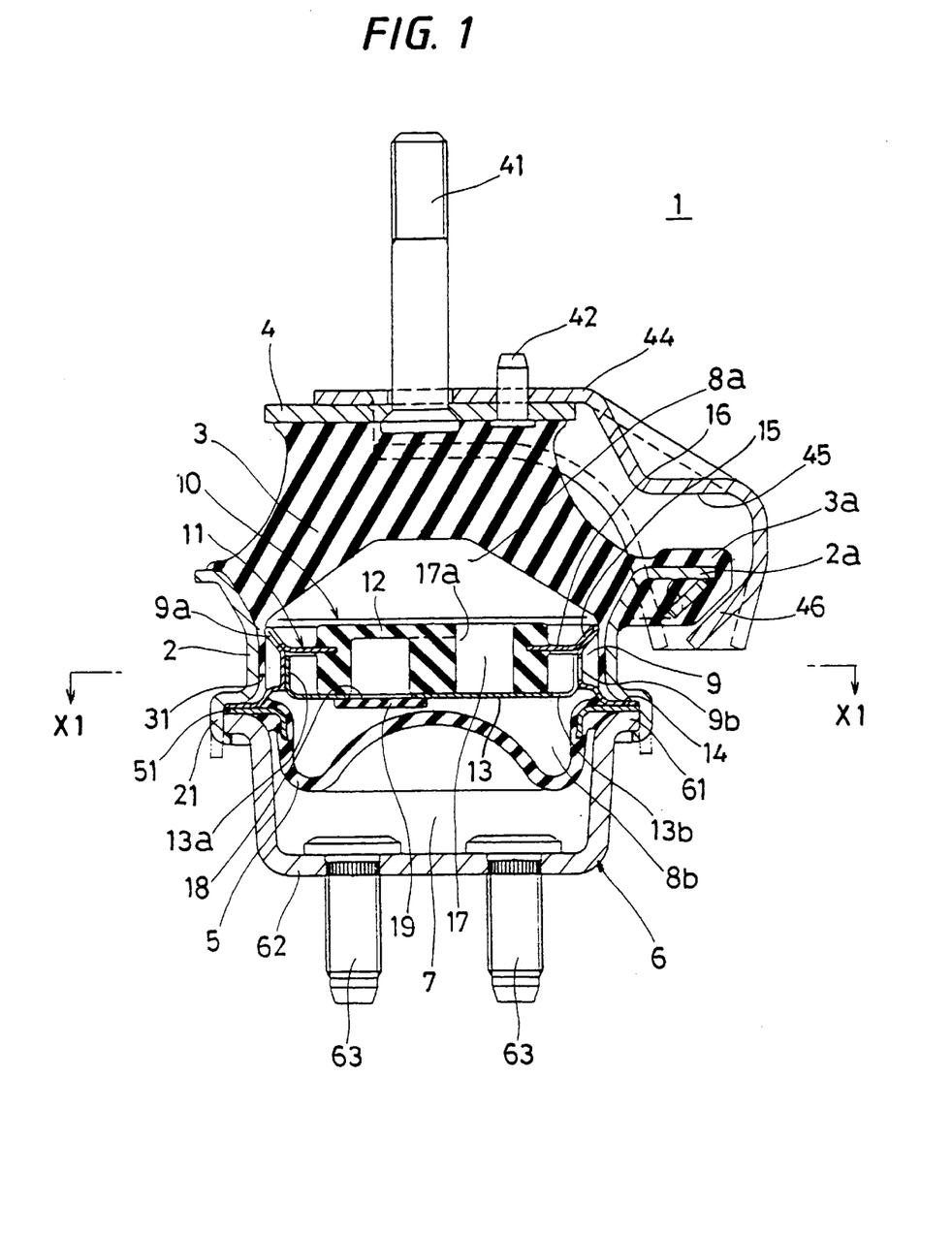
FIG. 1 is a longitudinal sectional view showing a first embodiment of a liquid filled vibration isolating device according to the invention.
Figure 2:
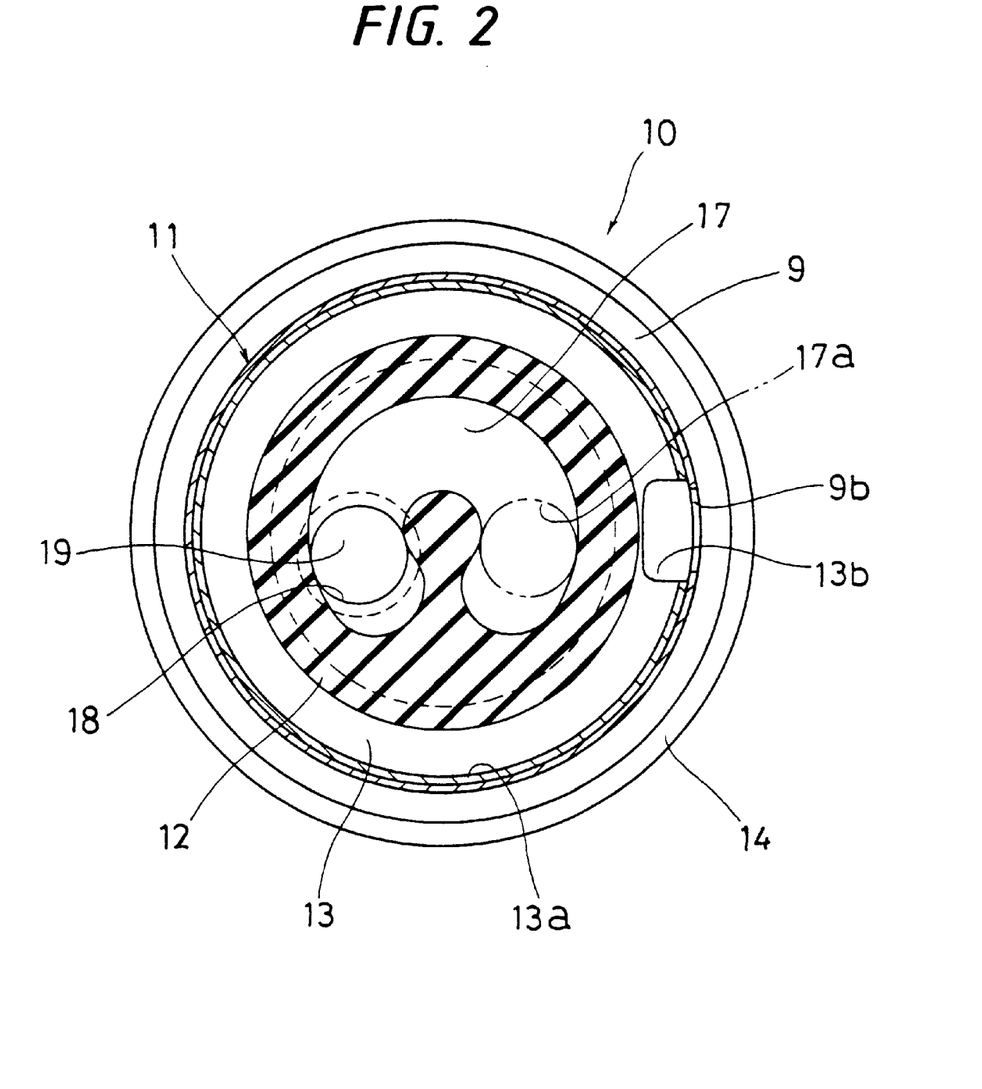
FIG. 2 is a sectional view taken from a line X1—X1 of FIG. 1.
Figure 3:
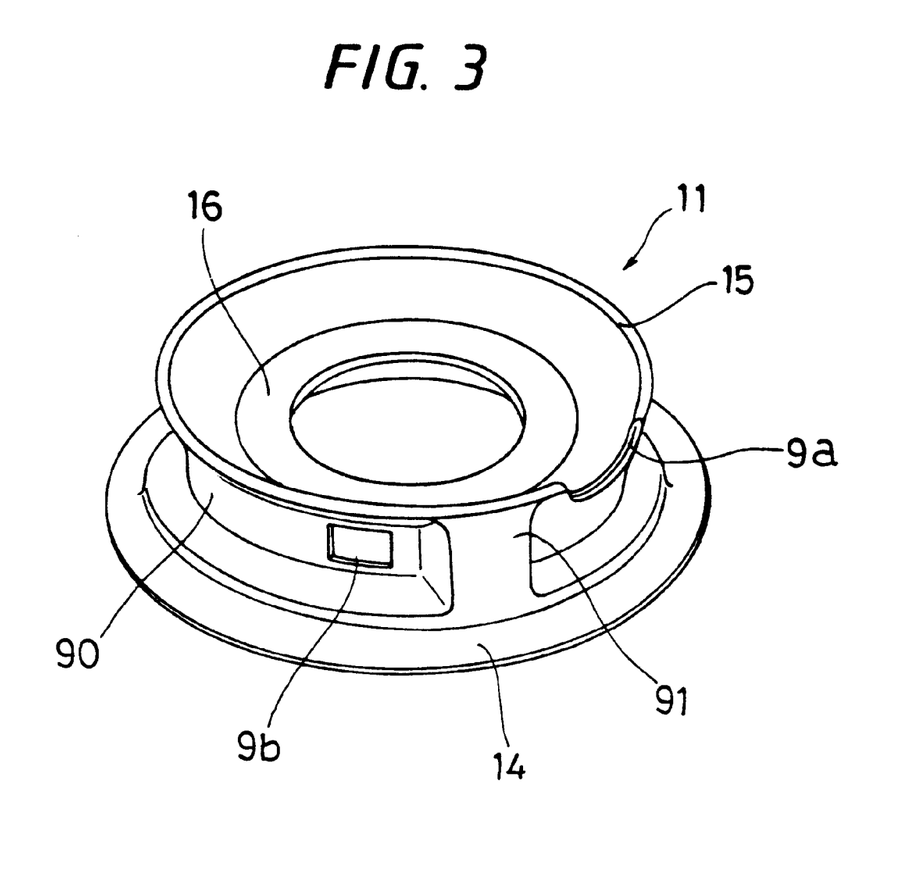
FIG. 3 is a perspective view showing a partition plate metal fitting constituting a partition member of the vibration isolating device.

FIG. 1 through FIG. 3 show a first embodiment of a liquid filled vibration isolating device according to the invention.

According to the liquid filled vibration isolating device 1, as shown by the drawings, a vibration isolating base body 3 formed of a rubber elastic body receiving a load of a power unit such as an engine is joined to an upper-opening part of a main-body metal fitting 2 having a cylindrical shape. Further, a first attaching metal fitting 4 on an upper side is joined to an upper end of the vibration isolating base body 3. That is, the main-body metal fitting 2 and the first attaching metal fitting 4 are joined together via the vibration isolating base body 3. In case of the drawing, the vibration isolating base body 3 has substantially a shape of a truncated cone. The upper end (a smaller-diameter-side end) of the vibration isolating base body 3 is fixedly connected in air tight to the first attaching metal fitting 4, while an peripheral edge portion in lower part (a larger-diameter-side part) of the vibration isolating base body 3 is fixedly connected in air tight to an opening portion of the main-body metal fitting 2. These connections are made by vulcanization-molding.

To a lower-opening part of the main-body metal fitting 2, a first diaphragm 5 formed of a rubber membrane and a second attaching metal fitting 6 (a lower metal fitting) covering the first diaphragm 5 are fixedly connected to be sealed, by caulking means mentioned later. The first diaphragm 5 is disposed opposedly to the vibration isolating base body 3. Further, a partition member 10 is fittedly connected in air tight state to an inner periphery of the main-body metal fitting 2 between the vibration isolating base body 3 and the diaphragm 5, via a seal rubber layer 31 integrally formed with the vibration isolating base body 3. In this way, an inner chamber between the vibration isolating base body 3 and the diaphragm 5 is formed as a liquid containing chamber filled with a noncompressive liquid such as water or ethylene glycol. Further, the liquid containing chamber is partitioned to a first liquid chamber 8a where the vibration isolating body 3 constitutes a portion of the chamber wall, and a second liquid chamber 8b where the diaphragm 5 constitutes a portion of the chamber wall. Further, the two liquid chambers, 8a and 8b are communicated with each other through a first orifice 9 provided at an outer periphery of the partition member 10. In this way, the liquid filled vibration isolating device of a two chambers type is constructed.

The first attaching metal fitting 4 have a flat plate shape, to central portion of which a first attaching bolt 41 is fixed by press-fitting means or welding means so as to be projected upward. Numeral 42 designates a projection for positioning. Thereby, the device is fixed to a power unit of an automobile, not illustrated, by the first attaching bolt 41 after being positioned by the projection 42.

The second attaching metal fitting 6 has substantially a shape of a bottomed cylinder. An opening edge portion 61 of the second attaching metal fitting 6 has a shape of a flange and is fixedly caulked to a lower-edge part 21 of the main-body metal fitting 2. Further, two pieces of second attaching bolts 63 are projectingly installed in a downward direction to a bottom wall portion 62 of the second attaching metal fitting 6 respectively by press-fitting means. An intermediary between the second attaching metal fitting 6 and the first diaphragm 5 is formed as an air chamber 7. Meanwhile, the second attaching metal fitting 6 is fixed to a predetermined position which is positioned to a vehicle body side member, not illustrated by the attaching bolts 63.

That is, the first attaching metal fitting 4 on the upper side is attached to a power unit of an engine while the second attaching metal fitting 6 on the lower side is attached to the vehicle body side member. In this way, the power unit can be supported by the vehicle body in a vibration isolating manner.

Further, as shown by FIG. 1 through FIG. 3, the partition member 10 have substantially a shape of a circular disk, and comprised by a partition-plate metal fitting 11, a rubber orifice member 12, an insert metal fitting 13 and so on, as detailed as follows.

The partition-plate metal fitting 11 is formed by pressing and has a ring-like shape as shown by FIG. 3. At its outer peripheral portion, the fitting 11 has a groove 90 for forming the -first orifice 9 between it and the main-body metal fitting 2. An edge portion 14 under the groove 90 is extended outwardly so as to have an outer diameter substantially equal to that of the opening edge portion 61 of the second metal fitting 6. An upper part of the partition-plate metal fitting 11 is formed as an upper projection 15 by folding back operation. On inner side of the upper projection 15, the partition-plate metal fitting 11 has a ring-shaped central plate 16 which has an opening at its central portion. A communicating aperture 9a for communicating the first orifice 9 with the first liquid chamber 8a is formed by a cut-away portion of the upper projection 15. Meanwhile, a communicating aperture 9b for communicating the first orifice 9 with the second liquid chamber 8b is perforated at a bottom wall (deepest portion) of the groove 90. While a blockage 91 is made to the groove 90, two communicating apertures 9a,9b are disposed at opposite sides of the blockage 91, that is, the blockage 91 is interposed between two communicating apertures 9a,9b.

A rubber orifice member 12 formed of a rubber elastic body is attached to an inner periphery of the ring-like central plate 16 of the partition-plate metal fitting 11 by vulcanization-molding. The rubber orifice member 12 is formed in a shape of a thick-walled circular disk, and at least has a shape projected to a lower-face side of the ring-like central plate 16. A semicircular groove for an orifice substantially in a shape of a semicircular ring or C-shape centering on an axis center of the device is formed on the lower face side. The opening on the lower-face side of the groove is totally covered by an insert metal fitting 13 which is connected to the lower face of the rubber orifice member 12. Consequently, the semicircular groove is formed as a second orifice 17. The semicircular groove can easily be formed at vulcanization-molding of the rubber orifice member 12.

The insert metal fitting 13 has a substantially cup-like shape in sectional view formed by pressing. By fixedly press-fitting an peripheral portion 13a of the insert metal fitting 13 into an inner periphery of the partition-plate metal fitting 11, the bottom face of the cup-like shape is connected with the lower face of the rubber orifice member 12. At one end of the second orifice 17, an opening 17a is formed for communicating with the first liquid chamber 8a on the side of the vibration isolating base body 3. At other end of the second orifice 17, a small aperture 18 is perforated in the insert metal fitting 13 in correspondence with the semicircular groove. A second diaphragm 19 formed of a rubber membrane is disposed to the small aperture 18 so that the small aperture 18 is occluded. Further, the insert metal fitting 13 has a cut-away portion 13b ranging from the outer peripheral wall 13a to the bottom face at a position, in correspondence with the communicating aperture 9b provided to the partition-plate metal fitting 11. The first orifice 9 communicates with the second liquid chamber 8b via the communicating aperture 9b and the cut-away portion 13b.

Further, a peripheral portion of the first diaphragm 5 is fixedly bonded by vulcanization-molding to a ring-like metal fitting 51 having an outer diameter substantially equal to that of the edge portion 14 of the partition-plate metal fitting 11. The diaphragm 5 is extended downwardly from an inner periphery of the ring-like metal fitting 51. An inward part of the diaphragm is able to be deformed in response to pressure variation in the second liquid chamber 8b.

According to the partition member 10 constituted as mentioned above, the edge portion 14 of the partition-plate metal fitting 11 is fixedly caulked to the lower-edge part 21 of the main-body metal fitting 2 along with the ring-like metal fitting 51 of the first diaphragm 5 and the edge portion 61 of the second attaching metal fitting 6.

In case of the illustrated embodiment, a portion of circumference on the large-diameter side of the vibration isolating base body 3 is outwardly projected to form an overhang 3a reinforced by an extended portion 2a of the main-body metal fitting 2. A stabilizer 44 is fixedly installed to the first attaching metal fitting 4 by welding means or the like. Portions 45 and 46 of the stabilizer are arranged adjacent to upper and lower sides of the overhang 3a, so as to achieve a stopper action in a large displacement of the first attaching metal fitting 4 caused by deformation of the vibration isolating base body 3. At the time of the large displacement, the portions 45 and 46 are brought into contact with the overhang 3a so as to regulate further displacement in the up and down direction.

Assembling procedure for above-mentioned liquid filled vibration isolating device 1 will be explained as follows.

On beforehand, the rubber orifice member 12 is integrally bonded to the inner periphery of the partition-plate metal fitting 11 in a ring-like shape by vulcanization-molding. Further, the rubber orifice member 12 is formed with a groove for orifice and the opening 17a by vulcanization-molding.

After that, the first stage of assembling is conducted in the air. The insert metal fitting 13 is press-fitted into the partition-plate metal fitting 11 from its lower-face side, so that insert metal fitting 13 butt on the rubber orifice member 12. In this way, there is assembled the partition member 10 formed with the second orifice 17 at an inward-side portion thereof and having the second diaphragm 19 at an end of the second orifice 17.

At this occasion, the communicating aperture 9b of the partition-plate metal fitting 11 and the cut-away portion 13b of the insert metal fitting 13 are positioned to each other to prevent the communicating aperture 9b from being occluded.

Next stage of the assembling is conducted in a liquid. The lower face (a side of an opening) of the main-body metal fitting 2 is set to face upward, to which lower face the first attaching metal fitting 4 is connected via the vibration isolating base body 3. The partition member 10 is fittedly attached to the inner periphery of the main-body metal fitting 2 in a state in which inside air has been excluded. The edge portion 14 of the partition-plate metal fitting 11 is press-fitted into the lower-edge part 21 of the main-body metal fitting 2 until the edge portion 14 butt on a stepped portion 21a of the lower-edge part 21, while the lower-edge part 21 is expanded or unfolded state before caulking (chain lines in FIG. 1). Subsequently, the first diaphragm 5 is incorporated by press-fitting the ring-like metal fitting 51, which forms peripheral of the diaphragm 5, into the lower-edge part 21.

In this way, the liquid is contained in the inner chamber between the first diaphragm 5 and the vibration isolating base body 3, followed by adjustment of amount of the contained liquid.

Thereafter, the entity is taken out into the air; the opening edge portion 61 of the second attaching metal fitting 6 is fitted to the lower-edge part 21; and the lower-edge part 21 is fixedly caulked; by which the assembling operation is completed.

In this way, the partition member 10, in which the second orifice 17 and the second diaphragm 19 are formed or attached, is assembled separately from the main-body metal fitting 2. The partition member 10 is press-fitted into the main-body metal fitting 2. Accordingly, the second orifice 17 and the second diaphragm 19 can be set without being influenced by shape or dimension of the caulked portion. That is, there can be constituted a vibration isolating device having the two orifices and the diaphragms installed thereto separately from each other, without varying shape or dimension of the caulking portion in the second attaching metal fitting 6 and the first diaphragm 5. Further, not only the assembling operation is facilitated, but deterioration of the mounting performance and the sealing performance of the caulked portion is prevented.

For use of the liquid filled vibration isolating device 1 according to the invention by the abovedescribed constitution, the first attaching metal fitting 4 is connected to a power unit such as an engine while the second attaching metal fitting 6 is connected to a member on the side of the vehicle body.

In working state of the vibration isolating device 1, when vibration is transmitted from a vibration generator such as an engine mounted on the first attaching metal fitting 4, the liquid in the both liquid chambers 8a and 8b flows through the first orifice 9 and the second orifice 17 in response to elastic deformation of the vibration isolating base body 3 formed of a rubber elastic body. The vibration isolation is effected by liquid column resonance effect and liquid pressure damping effect by the flow in the orifices.

Structural design of the first orifice 9 and the first diaphragm 5 at one end of flow (on second liquid chamber), and structural design of the second orifice 17 and the second diaphragm 19 at another end of flow are set respectively so that effective vibration damping effect is achieved at respective frequency ranges different from each other. For example, sectional area or length of the first orifice 9 are set to achieve a remarkable damping effect on low frequency vibration of 10 through 15 Hz with large amplitude, such as shake vibration. Meanwhile, sectional area or length of the second orifice 17 are set to achieve a remarkable damping effect on high frequency vibration of 30 through 40 Hz with middle and small amplitude, such as vibration at idling of engine. Further, in correspondence therewith, the moduli of elasticity of the first and second diaphragms 5 and 19 are set.

Thereby, the excellent vibration isolating effect is accomplished in two frequency regions of shake vibration and engineidling vibration.

On the other hand, as shown by the drawings, the rubber orifice member 12 formed of a rubber elastic body is disposed at the central portion of the partition member 10, while a portion of the partition member 10 faces the first liquid chamber 8*a* on the side of the vibration isolating base body 3 (pressure receiving side). Further, the bottom wall portion (deepest portion of the groove for the orifice) of the second orifice 19 which is more thin-walled than other portions is brought into contact with the liquid chamber 8*a* at the facing portion. Therefore, an effect of reducing absolute spring constant in a high frequency region of 100 Hz or higher is also achieved.

Figure 4:
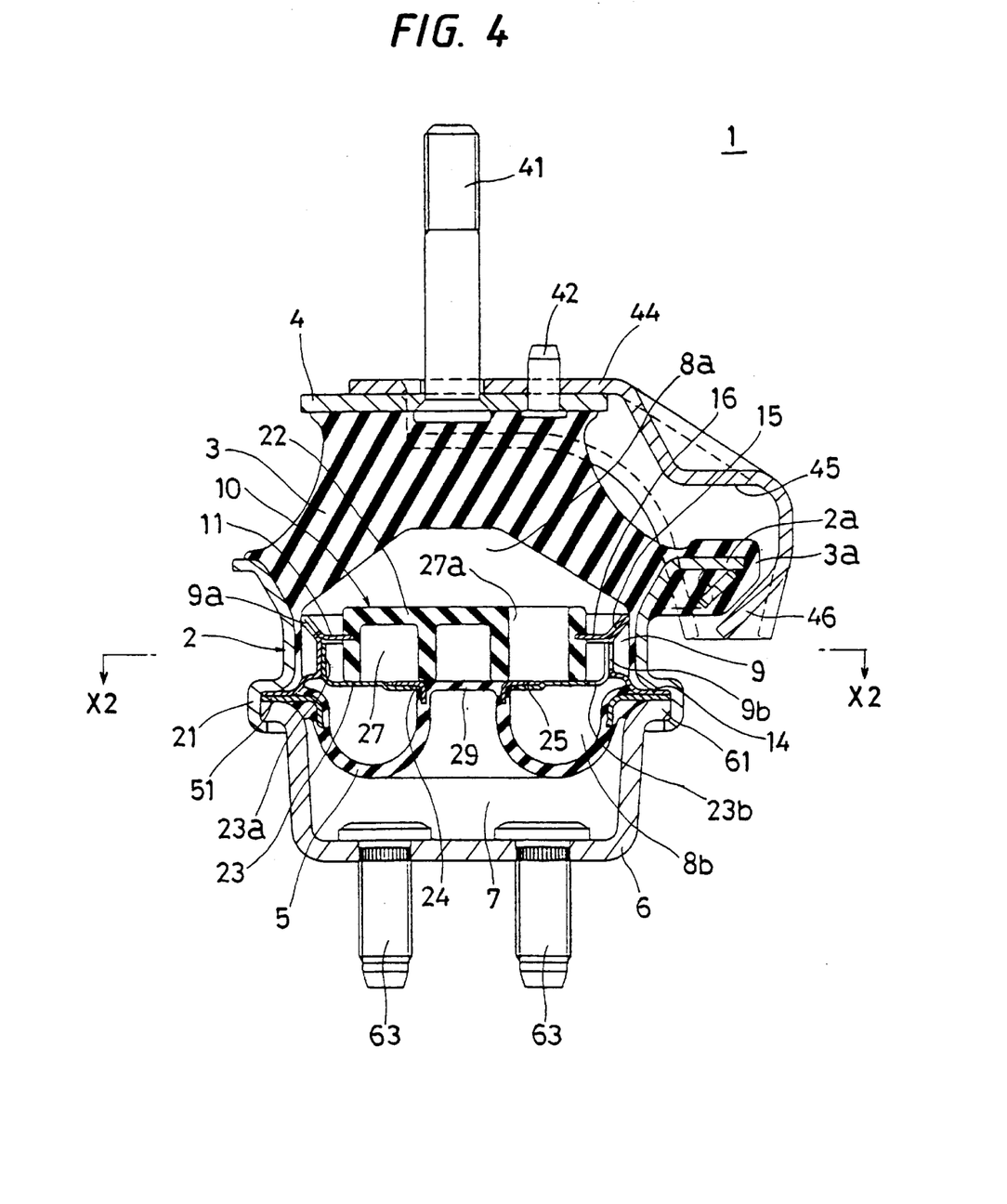
FIG. 4 is a longitudinal sectional view showing a second embodiment.
Figure 5:
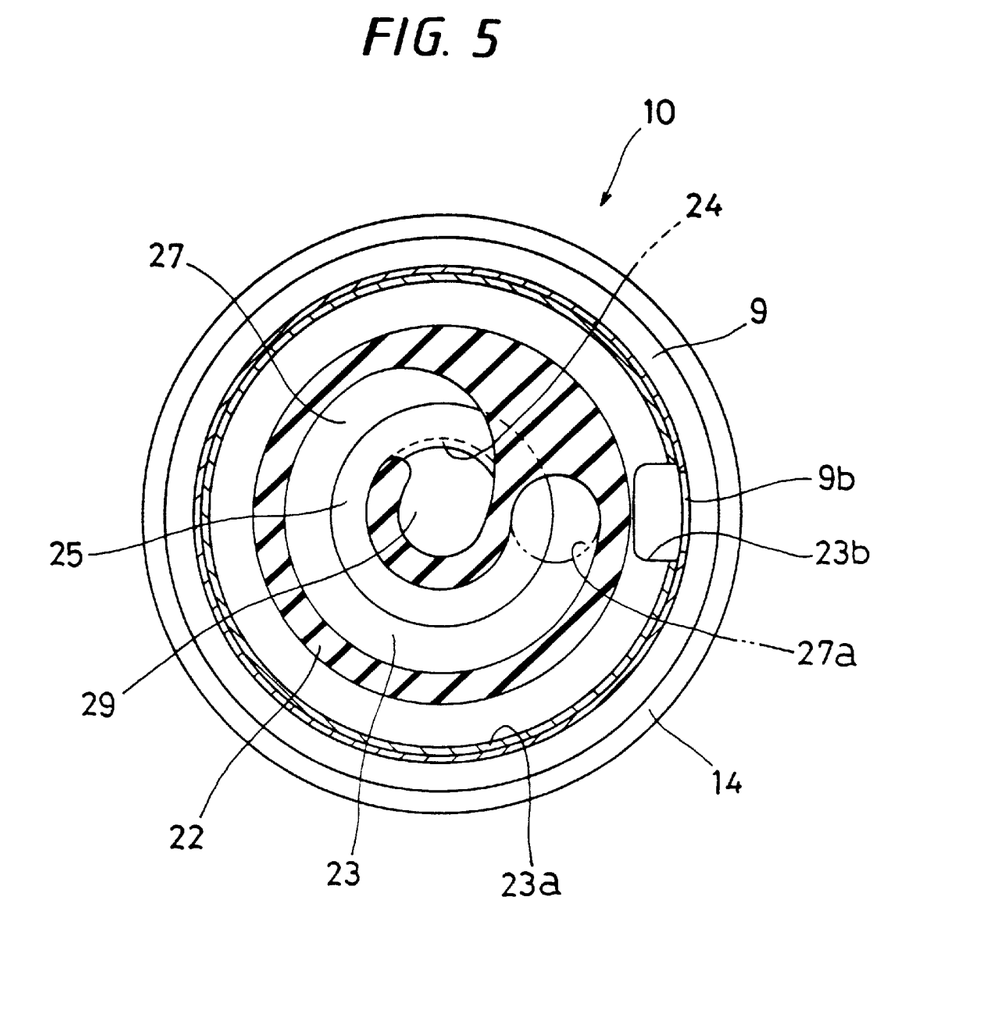
FIG. 5 is a sectional view taken from a line X2—X2 of FIG. 4.

FIG. 4 and FIG. 5 show a second embodiment of the liquid filled vibration isolating device 1 according to the invention. In the embodiment, the same constituent portions or members as those of the vibration isolating device according to first embodiment mentioned above are attached with the same reference number. Detailed explanation thereof will be omitted.

The liquid filled vibration isolating device 1 according to the embodiment is the same as that of the first embodiment in view of the basic constitution, comprising: the vibration isolating base body 3 substantially in a shape of a truncated cone formed of a rubber elastic body; the first attaching metal fitting 4 joined to the upper end portion of the vibration isolating base body 3; the main-body metal fitting 2 in a cylindrical shape fixedly attached to the outer periphery of the lower end portion of the vibration isolating base body 3; the first diaphragm 5 attached to the opening portion on the lower side of the main-body metal fitting 2 opposedly to the vibration isolating base body 3; and the second attaching metal fitting 6 in a shape of a bottomed cylinder fixedly caulked to the lower-edge part 21 of the main-body metal fitting 2 to cover the outer side of the diaphragm 5. Further, the intermediary between the vibration isolating base body 3 and the diaphragm 5 is formed as the liquid containing chamber; and the liquid containing chamber is partitioned to the first liquid chamber 8*a*, where the vibration isolating base body 3 constitutes a portion of the chamber wall, and the second liquid chamber 8*b* where the diaphragm 5 constitutes a portion of the chamber wall, by the partition member 10 fittedly attached to the inner periphery of the main-body metal fitting 2; and the two liquid chambers 8*a* and 8*b* are communicated with each other by the first orifice 9 provided at the outer periphery of the partition member 10.

According to the second embodiment, the partition member 10 is constituted as follows: that is, the partition-plate metal fitting 11, a rubber orifice member 22, and the insert metal fitting 23 are constituted as explained below in detail.

As above-mentioned first embodiment, the partition-plate metal fitting 11 in a ring-like shape has the first orifice 9; a rubber orifice member 22 formed of a rubber elastic body is attached to the central plate portion 16 by vulcanization-molding; and an insert metal fitting 23 is brought into contact with the lower face of the rubber orifice member 22, that is, on a side of the second liquid chamber 8*b* thereof.

Whereas the partition-plate metal fitting 11 has the same configuration as that in case of the first embodiment, as shown by FIG. 4 and FIG. 5, the rubber orifice member 22 has a groove for orifice in a spiral shape centering on the axis center of the device on a side thereof in contact with the insert metal fitting 23; and the groove is formed as a second orifice 27 in a spiral shape by being covered by the insert metal fitting 23 which is brought into contact with the orifice member 22. By constituting the groove for orifice in a spiral shape, the second orifice 27 can be prolonged. An aperture 27*a* for communicating with the first liquid chamber 8*a* on the vibration isolating base body 3 is disposed at the outer end of the second orifice 27 in a spiral shape, while a second diaphragm 29 held at the central portion of the insert metal fitting 23 is disposed at a central inner end of the second orifice 27 in a spiral shape.

The section of the insert metal fitting 23 is formed in a cup-like shape by pressing or the like; a bottom wall portion of the cup-like shape (that is, inward portion) has an aperture 24; and an inner metal fitting 25 in a ring-like shape which is pressed onto the rubber orifice member 22 is fixedly bonded with a central portion of the first diaphragm 5 by vulcanization-molding at the periphery of the aperture 24. Further, a second diaphragm 29 having a thickness different from the thickness of the first diaphragm 5 covers aperture area inside the inner metal fitting 25; the second diaphragm 29 is formed integrally with the first diaphragm 5 by a rubber elastic body. An outer peripheral portion 23*a* of the insert metal fitting 23 is press-fitted into the partition-plate metal fitting 11 to be brought into contact with the rubber orifice member 22. By this, the inner metal fitting 25 is pressed onto the rubber orifice member 22 at the periphery of the aperture 24 of the insert metal fitting 23. Consequently, the inner end of the second orifice 27 is occluded by the second diaphragm 29.

Therefore, the first diaphragm 5 is extended downward from the ring-like metal fitting 51, that forms periphery of the first diaphragm 5, extended inward and connected to the inner metal fitting 25. Thus, the second liquid chamber 8*b* in a ring-like shape is formed between the first diaphragm 5 and the partition member 10. In case of this embodiment, the first diaphragm 5 exclusively associated with the first orifice 9 is formed at outward-side (outer-diameter side) of the ring-like inner metal fitting 25, while the second diaphragm 29 exclusively associated with the second orifice 27 is formed at inward-side (on its inner diameter side) of the inner metal fitting 25. In this way, two different diaphragms are formed.

Further, the first orifice 9 is communicated with the second liquid chamber 8*b* via a cut-away portion 23*b* provided to the insert metal fitting 23 at a position in correspondence with the communicating aperture 9*b* of the orifice 9 similar to the case of the first embodiment mentioned above.

In assembling the vibration isolating device 1 according to the second embodiment, the insert metal fitting 23 is press-fitted to the partition-plate metal fitting 11 attachingly installed with the rubber orifice member 22. At the same time, the first diaphragm 5 is integrated to the partition member 10, so that the inner metal fitting 25 attachingly installed to the central portion of the first diaphragm 5 is pressed onto the rubber orifice member 22.

Further, in a state in which the main-body metal fitting 2 joined with the vibration isolating base body 3 and the first attaching metal fitting 4 is set in a liquid to exclude air at inside thereof, the partition member 10 is fittedly mounted to the inner periphery of the main-body metal fitting 2. The edge portion 14 of the partition-plate metal fitting 11 is press-fitted into the lower-edge part 21 of the main-body metal fitting 2 until butting on the stepped portion 21*a*. At the same time, the ring-like metal fitting 51 at the outer periphery of the first diaphragm 5 is press-fitted into the lower-edge part 21.

In this way, the liquid is contained in the inner chamber at an intermediary between the first diaphragm 5 and the vibration isolating base body 3, thereafter, the entity is taken out into the atmosphere, the opening edge portion 61 of the second attaching metal fitting 6 is fitted to the lower-edge part 21 and the lower-edge part 21 is fixedly caulked thereby the assembling operation is completed.

Thereby, there can be constituted a vibration isolating device having the two orifices and the diaphragms separately installed thereto capable of being assembled easily and capable of setting the second orifice 27 and the second diaphragm 29 without being influenced by shape of dimension of the caulked portion similar to the first embodiment.

Further, also in case of the vibration isolating device, similar to the first embodiment, structural design of the first orifice 9 and the first diaphragm 5 at one end of flow, and structural design of the second orifice 27 and the second diaphragm 29 at another end of flow are respectively adjusted to frequency regions different from each other. Thereby, a excellent vibration damping effect and a vibration insulating effect are able to be achieved at two different kinds of vibration--shake vibration having low frequency and large amplitude, as well as engine-idling vibration having medium and high frequency and small amplitude.

Figure 6:
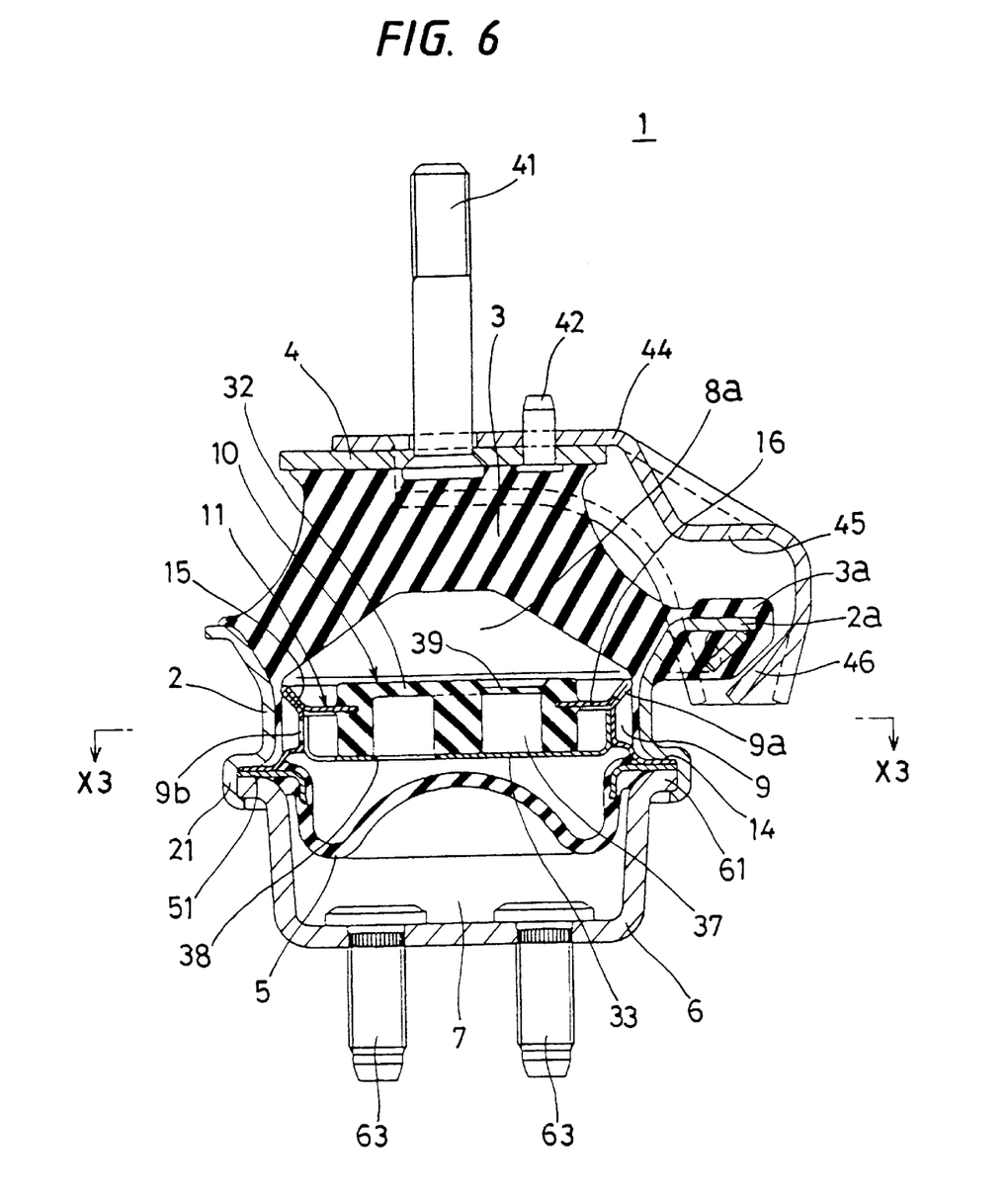
FIG. 6 is a longitudinal sectional view showing a third embodiment.
Figure 7:
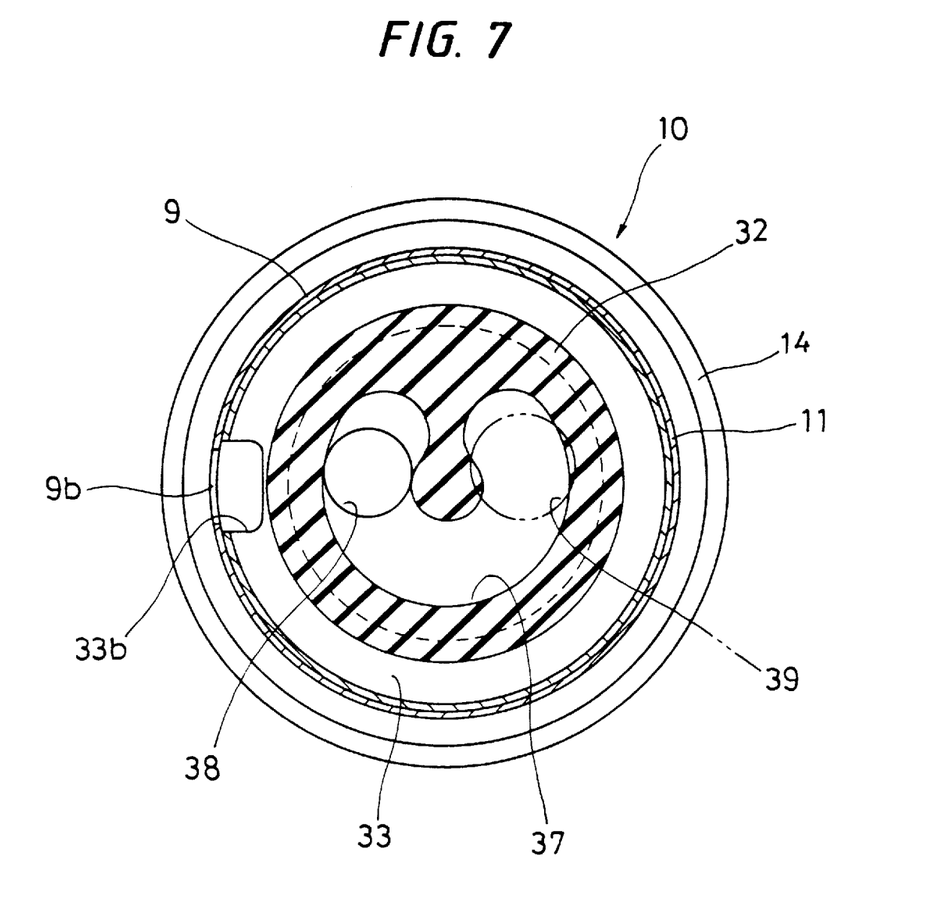
FIG. 7 is a sectional view taken from a line X3—X3 of FIG. 6.

FIG. 6 and FIG. 7 show a third embodiment of the liquid filled vibration isolating device 1 according to the invention. Also in the embodiment, the same constituent portions or members as those in the first embodiment are attached with the same reference number. Thus, a detailed explanation on those portions or members will be omitted.

According to the vibration isolating device 1 of the third embodiment, a point which differs from the embodiment of FIG. 1 through FIG. 3 resides in that a second orifice 37 at an inner portion of the partition member 10 has a second diaphragm 39 between one end of the second orifice 37 and the first liquid chamber 8a.

The partition member 10 is constituted by the partition-plate metal fitting 11 forming the first orifice 9, a rubber orifice member 32 and an insert metal fitting 33 which is brought into contact with the rubber orifice member 32. Further, on a side of the rubber orifice member 32 in contact with the insert metal fitting 33 (lower face side), a groove for forming an orifice is formed as shown by FIG. 7. The groove is covered by the insert metal fitting 33 so that the groove is formed as the second orifice 37. Particularly at one end of the second orifice 37, the second diaphragm 39 having a thin wall thickness is formed integrally with the rubber orifice member 32 between the second orifice 37 and the first liquid chamber 8a. Meanwhile, other end of the second orifice 37 communicates with the second liquid chamber 8b through a small aperture 38 provided to the insert metal fitting 33. Other points thereof are constituted by the same structures as those of the first embodiment and the assembling operation can be carried out similar to the first embodiment.

In a similar manner with preceding embodiments, with this embodiment of the invention, an excellent vibration damping is able to be effected on shake vibration having low frequency and large amplitude and on engine-idling vibration having medium and high frequency and small amplitude, by adjusting the first diaphragm 5 at the end of the first orifice 9 and the second diaphragm 39 to be able to correspond to vibration in frequency ranges respectively different from each other. For example, a damping effect is able to be achieved mainly by a liquid column resonance effect of the first orifice 9 having the first diaphragm 5 at its one end, on shake vibration having low frequency and large amplitude and on engine idling vibration having medium and high frequency and small amplitude. The vibration is able to be damped by a liquid column resonance effect by the second orifice 37 having the second diaphragm 39 at its end portion.

What is claimed is:

1. A liquid filled vibration isolating device comprising:
   a vibration isolating base body formed of a rubber elastic body;
   a first attaching metal fitting joined to one of an upper side and a lower side of the vibration isolating base body;
   a main-body metal fitting in a cylindrical shape joined to the other side of the vibration isolating base body;
   a first diaphragm, formed of a rubber membrane, being attached to the main-body metal fitting to oppose to the vibration isolating base body; and
   a second attaching metal fitting in a shape of a bottomed cylinder attached to the main-body metal fitting to cover the first diaphragm from outside;
   wherein a liquid filled chamber, formed between the vibration isolating base body and the first diaphragm, is partitioned into two liquid chambers by a partition member, while the two liquid chambers are communicated with each other by an orifice in the partition member;
   wherein the partition member comprises:
   a ring-shaped partition-plate metal fitting, disposed between the vibration isolating base body and the first diaphragm, being connected with the inner face of main-body metal fitting, and having a first orifice communicating the two liquid chambers with each other, at an outer peripheral portion of the partition-plate metal fitting;
   a rubber orifice member, formed of a rubber elastic body, attached to an inner edge of the partition-plate metal fitting; and
   an insert metal fitting, fixed to the partition-plate metal fitting, being connected with a first-diaphragm-facing face of the rubber orifice member;
   wherein the rubber orifice member has a second orifice which faces the insert metal fitting; one end of the second orifice is opened to either of the one liquid chamber on the vibration isolating base body and the other liquid chamber on the first diaphragm; other end of the second orifice is occluded by a second diaphragm formed of a rubber membrane; and the partition member is fixedly caulked to the main-body metal fitting along with the first diaphragm and the second attaching metal fitting.

2. The liquid filled vibration isolating device according to claim 1:
   wherein the rubber orifice member has a semicircular groove for the orifice, in a shape of substantially a semicircular ring, which faces the insert metal fitting; the semicircular groove is covered by the insert metal fitting which is connected with the rubber orifice member, so as to form the second orifice; one end of the second orifice has an aperture communicating with the liquid chamber on the vibration isolating base body; and other end of the second orifice is occluded by the second diaphragm which is attached to a small hole perforated in the insert metal fitting.

3. The liquid filled vibration isolating device according to claim 1:
   wherein the rubber orifice member has a spiral-shape groove for the orifice, in a spiral shape centering on an axis center of the device, which faces the insert metal fitting; the spiral-shape groove is covered by the insert metal fitting which is connected with the rubber orifice member so as to constitute the second orifice in a spiral shape; outer end of the second orifice in the spiral shape forms an aperture for communicating with the liquid chamber on the vibration isolating base body; and inner end of the second orifice is occluded by the second diaphragm which is held at a central portion of the insert metal fitting.

4. The liquid filled vibration isolating device according to claim 3:

wherein the central portion of the insert metal fitting is opened; at a surrounding of the opening, an inner metal fitting in a ring-like shape is pressed onto the rubber orifice member; the inner metal ring is fixedly connected to a central portion of the first diaphragm; the second diaphragm is integrally formed with an inner edge of the inner metal fitting; and the inner metal fitting is pressed onto the insert metal fitting at the surrounding of the opening, so that the inner end of the second orifice is occluded.

5. The liquid filled vibration isolating device according to claim 1:

wherein the rubber orifice member has a semicircular groove for the orifice, in a shape of a substantially semicircular ring, which faces the insert metal fitting, the semicircular groove is covered by the insert metal fitting which is connected with the rubber orifice member, so as to form the second orifice; the second diaphragm is integrally formed with the rubber orifice member between the second orifice and the liquid chamber on the vibration isolating base body, at one end of the second orifice; and other end of the second orifice is opened to the liquid chamber on the side of the first diaphragm, through an aperture perforated in the insert metal fitting.

* * * * *